United States Patent
Buck

(10) Patent No.: US 11,394,746 B2
(45) Date of Patent: Jul. 19, 2022

(54) DNS PREFETCHING BASED ON TRIGGERS FOR INCREASED SECURITY

(71) Applicant: Lookout, Inc., San Francisco, CA (US)

(72) Inventor: Brian James Buck, Livermore, CA (US)

(73) Assignee: Lookout, Inc., San Francisco, CA (US)

( * ) Notice: Subject to any disclaimer, the term of this patent is extended or adjusted under 35 U.S.C. 154(b) by 556 days.

(21) Appl. No.: 16/296,005

(22) Filed: Mar. 7, 2019

(65) Prior Publication Data

US 2020/0287933 A1 Sep. 10, 2020

(51) Int. Cl.
| | |
|---|---|
| H04L 29/06 | (2006.01) |
| H04L 9/40 | (2022.01) |
| H04L 61/4511 | (2022.01) |
| H04L 61/59 | (2022.01) |

(52) U.S. Cl.
CPC ...... H04L 63/1483 (2013.01); H04L 61/1511 (2013.01); H04L 61/6013 (2013.01)

(58) Field of Classification Search
CPC ............. H04L 63/1483; H04L 61/1511; H04L 61/6013
See application file for complete search history.

(56) References Cited

U.S. PATENT DOCUMENTS

| | | | | |
|---|---|---|---|---|
| 2010/0191856 A1* | 7/2010 | Gupta | ............... | H04L 29/12066 709/228 |
| 2013/0198269 A1* | 8/2013 | Fleischman | ............. | H04L 61/20 709/203 |
| 2014/0068043 A1* | 3/2014 | Archbold | ............ | H04L 61/1511 709/223 |
| 2016/0286001 A1* | 9/2016 | Chan | ................... | H04L 12/6418 |
| 2020/0106790 A1* | 4/2020 | Bagnall | .................... | G06F 16/23 |
| 2020/0106791 A1* | 4/2020 | Bagnall | ............... | H04L 63/1425 |
| 2020/0236139 A1* | 7/2020 | Arunachalam | ....... | H04L 63/205 |
| 2021/0105251 A1* | 4/2021 | Baldwin | ............. | H04L 63/1466 |

* cited by examiner

*Primary Examiner* — Gil H. Lee
*Assistant Examiner* — Juan C Turriate Gastulo
(74) *Attorney, Agent, or Firm* — Greenberg Traurig

(57) ABSTRACT

Techniques for DNS prefetching based on application or contextual triggers to increase security in prefetching. The techniques can include storing historical DNS information from sources of DNS information. The historical DNS information can include historical DNS requests and triggering events correlated to the historical DNS requests. The techniques can also include identifying, by a processor or one or more sensors, an occurrence of a triggering event. The techniques can also include, in response to identifying the occurrence of the triggering event, resolving one or more answers to one or more DNS requests correlated with the triggering event based on the stored historical DNS information. The techniques can also include storing the one or more answers for later use by requesters.

21 Claims, 7 Drawing Sheets

300

Storing historical DNS information from a plurality of sources of DNS information including a plurality of historical DNS requests
and
storing, with the historical DNS information, assessments for each of the plurality of historical DNS requests
302

Identifying an occurrence of a triggering event
304

In response to identifying the occurrence of the triggering event:
(1)
resolving, within a certain configurable time period after the triggering event, one or more answers to one or more DNS requests corelated with the triggering event based on the stored historical DNS information
and
(2)
determining a legitimacy level of the one or more answers to the one or more DNS requests corelated with the triggering event based on the assessments
306

Acting on the one or more answers according to the determined legitimacy level of the one or more answers
308

Requesting, by a particular application, the one or more answers
310

Storing historical DNS information from a plurality of sources of DNS information including a plurality of historical DNS requests and a plurality of triggering events corelated to the plurality of historical DNS requests
and
storing, with the historical DNS information, assessments for each of the plurality of triggering events corelated to the plurality of historical DNS requests
402

↓

Identifying an occurrence of a triggering event
404

↓

In response to identifying the occurrence of the triggering event:
(1)
resolving, within a certain configurable time period after the triggering event, one or more answers to one or more DNS requests corelated with the triggering event based on the stored historical DNS information
and
(2)
determining a legitimacy level of the triggering event based on the assessments
406

↓

Acting on the one or more answers according to the determined legitimacy level of the triggering event
408

↓

Requesting, by a particular application, the one or more answers
410

Identifying an occurrence of a triggering event correlated with DNS request(s)

502

↓

In response to identifying the occurrence of the triggering event, resolving DNS answer(s) to the DNS request(s)

504

↓

Determining that a part of the answer(s) or the DNS request(s) is missing from a list of acceptable parts of a DNS answer or a DNS request

- wherein the list comprises a list of allowable DNS servers to be used by a specific list of applications specified in at least one of a profile of a computing device and a profile of a computer network, and
- wherein the part missing from the list is a particular DNS server

506

↓

In response to the determining that the part is missing from the list, performing a particular action

DNS PREFETCHING BASED ON TRIGGERS FOR INCREASED SECURITY

FIELD OF THE TECHNOLOGY

At least some embodiments disclosed herein relate to domain name system (DNS) prefetching based on application or contextual triggers.

BACKGROUND

Prefetching is a technique for speeding up fetch operations by performing fetches that are expected before the fetches are needed by an application. Usually prefetching includes fetching before it is known to be needed. The technique can be applied in several circumstances, such as prefetching of DNS information by web browsers or mobile applications. For example, when first rendering a website on a browser, a prefetch can retrieve many resources in advance of when the resources are needed, such as by making twenty to thirty requests in a prefetch.

Link prefetching or DNS prefetching empowers web browsers and apps to preload resources. This can improve the performance in loading and rendering websites and apps. Link prefetching can be accomplished through hints in web pages or apps. These hints are used by a web browser or application to prefetch links. Resources which can be prefetched include: JavaScript, CSS, image, audio, or video files, and the like. DNS names and TCP connections can also be included in information retrieved from prefetching.

With the benefits of prefetching there are some tradeoffs. In general, prefetching includes a risk of wasting time and resources by prefetching data that may not be used. In this way and others, prefetching (and DNS prefetching) has performance impacts. DNS resolution times can be a significant factor in the performance of mobile applications and web browsers. Some attempts have been made to prefetch DNS information based on hints provided in online content. Other attempts to prefetch from a DNS client have been based on start-up routines of certain applications. However, no known DNS prefetch methods have been implemented without requiring hints from content authors or application developers.

Also, problems faced by conventional DNS prefetching can include accidental misconfiguration of DNS servers (such as via memory error) or willful misconfiguration of DNS servers by attackers. When a DNS server is misconfigured, it can resolve DNS requests incorrectly such that the requests are vulnerable to threat actors or the requests result in answers that include domains owned by threat actors. These are just some of the risks involved with misconfiguration of DNS servers.

Another problem faced by conventional DNS prefetching, as well as fetching in general, is the instance of a malicious application running on a device connected to a private network. The threatening device can conduct surveillance on the private network using DNS prefetching—and using link fetching in general. A potentially malicious application running on the device can run inside or be connected to an enterprise's internal network and thus conduct surveillance on stored data, data communications, application operations and device operations in the internal network. Information retrieved from such threat actors, which is often prefetched or fetched, may then be used for attacks on the private network. For instance, maliciously gained knowledge that certain named servers and IP addresses exist in a private network, by a surveillance application, is a serious security concern.

Bitsquatting is also a security concern. Bitsquatting is a form of cybersquatting that involves the registration of domain names likely to be the result of a random memory error in a computer requesting a corresponding authentic domain, e.g. excmple.com or exaeple.com for example.com. For instance, the error character 'c' has the binary representation (in ASCII, e.g.) of 0110 0010, whereas the correct character 'a' has the binary representation of 0110 0011; the binary representation of 'c' is "off by one bit" from the binary representation of 'a'. In another example, the error character 'e' has the binary representation (in ASCII, e.g.) of 0110 0101, whereas the correct character 'm' has the binary representation of 0110 1101; the binary representation of 'e' is "off by one bit" from the binary representation of 'm'.

SUMMARY OF THE DESCRIPTION

Techniques for DNS prefetching based on application or contextual triggers are described herein.

The techniques disclosed herein for DNS prefetching based on application or contextual triggers provide specific technical solutions to at least overcome the technical problems mentioned in the background section and other parts of the application as well as other technical problems not described herein but recognized by those skilled in the art.

The techniques can include storing historical DNS information from sources of DNS information. The historical DNS information can include historical DNS requests and triggering events correlated to the historical DNS requests. The techniques can also include identifying, such as by a processor or one or more sensors, an occurrence of a triggering event. The techniques can also include, in response to identifying the occurrence of the triggering event, resolving one or more answers to one or more DNS requests correlated with the triggering event based on the stored historical DNS information. The techniques can also include storing the one or more answers so that a particular application, such as a web browser or a download mobile application, can request the one or more answers.

Also, the techniques can include identifying an occurrence of a triggering event correlated with one or more DNS requests, and in response to identifying the occurrence of the triggering event, resolving one or more DNS answers to the one or more DNS requests. The techniques can also include determining that a part of the one or more answers or the one or more DNS requests is missing from a list of acceptable parts of a DNS answer or a DNS request. The list can include a list of allowable DNS servers to be used by a specific list of applications specified in a profile of a computing device and/or a profile of a computer network. The part missing from the list can be a particular DNS server. Also, in response to the determining that the part is missing from the list, the techniques can include performing a particular action, such as prohibiting use or creation of a network connection with the particular DNS server.

Alternatively, the list can include a list of allowable applications to be used within a private network and the part missing from the list is a particular application. And, in response to the determining that the part is missing from the list, the techniques can include performing a particular action, such as prohibiting resolution, by the particular application, of addresses internal to the private network.

This disclosure includes various systems and devices that can perform the above methods as well as other methods described herein, which includes a non-transitory computer readable medium having instructions which when executed by a processor on a data processing system can cause the processor and/or the system to perform any one of the methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 shows another example method 300 for DNS prefetching based on application or contextual triggers, according to some embodiments.

FIG. 4 shows another example method 400 for DNS prefetching based on application or contextual triggers, according to some embodiments.

FIG. 5 shows an example method 500 for validating and acting accordingly on DNS prefetching based on application or contextual triggers, according to some embodiments.

DETAILED DESCRIPTION

Figure 1:
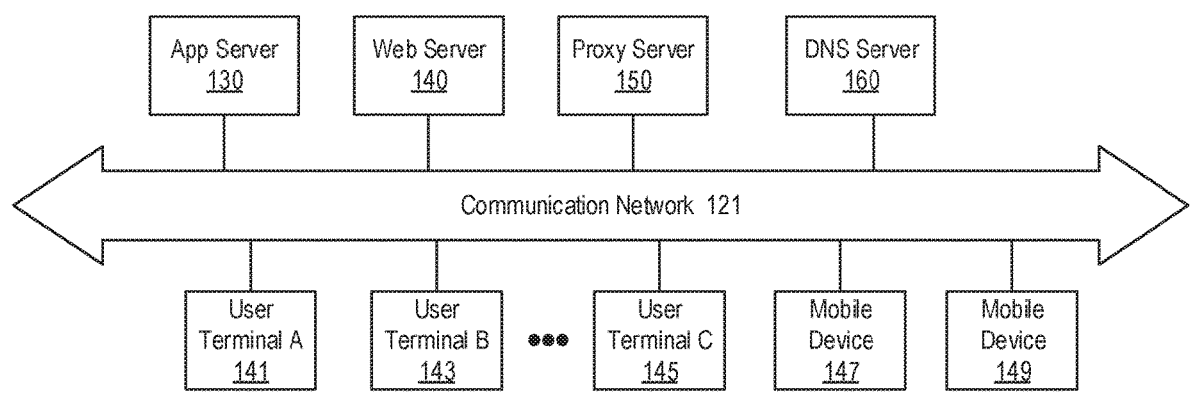
FIG. 1 shows a system for DNS prefetching based on application or contextual triggers, according to some embodiments.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in some embodiments" in various places in the specification are not necessarily all referring to the same embodiments, nor are separate or alternative embodiments mutually exclusive of other embodiments. Moreover, various features are described which may be exhibited by some embodiments and not by others. Similarly, various requirements are described which may be requirements for some embodiments but not other embodiments.

DNS Prefetch Based on Application or Contextual Triggers

Techniques for prefetching DNS information based on application or contextual triggers, are described herein.

DNS prefetching allows web browsers and applications to preload resources. This can improve the performance in loading and rendering websites and applications. Prefetching is accomplished through hints in websites or applications. Resources which can be prefetched include: JavaScript, CSS, image, audio, or video files, and the like. DNS names and TCP connections can also be included in information retrieved from prefetching.

With the benefits of prefetching there are some technical problems. In general, prefetching includes a risk of wasting time and resources by prefetching data that may not be used. In this way and others, prefetching (and DNS prefetching) has performance impacts. DNS resolution times can be a significant factor in the performance of mobile applications and web browsers. Some attempts have been made to prefetch DNS information based on hints provided in online content. Other attempts to prefetch from a DNS client have been based on start-up routines of certain applications. However, no known DNS prefetch methods have been implemented without requiring hints from content authors or application developers.

What is needed is way for the benefits of DNS prefetch to be obtained without requiring hints from content authors, or DNS clients to perform multiple DNS requests based on triggers.

A security application or another type of component running on a computing device can determine triggering events that can be used to activate DNS prefetching.

Some triggering events can be application events that can be identified by a processor, e.g., the launch of a particular application, or a DNS request issued by a particular application, e.g., the first DNS request that an application can issue after launching. Other triggering events can be sensed events sensed by one or more sensors, e.g., a user of a mobile device picks up the device which had been at rest on a surface or in a pocket, and the pick-up event is sensed by one or more sensors of the device such as an accelerometer and gyroscope sensor in the device. Other triggers can include unlocking of a computing device by a user, or swiping to a screen including an icon of an application that is likely to be executed after the swipe.

A user of a computing device can have a pattern of behavior with the device and applications loaded on the device. Also, a user of a web browser of a device can have a pattern of visiting certain websites via the browser shortly after activating the browser and/or picking up and unlocking the computing device.

Triggers can also be or include geographic and/or temporal trigger events. For example, a computing device nearing or arriving at a particular location, such as the user's work or home location, during a particular day or time of the week, can be a triggering event associated with a particular prefetch of DNS information. This is helpful, in that a user of a device can have a normal pattern of behavior to use certain applications on a device or visit certain websites via a browser shortly after one or more of geographic and/or temporal triggering events. The prefetch, or a fetch in general, executed after a triggering event allows gathering of resources prior to use of an application or browser even earlier than conventional prefetches.

Prior history of behavior of a user with a device (or prior history of device behavior of users in general or particular types of users in general), prior history of behavior of a downloaded app, and/or prior history of behavior of a browser can be collected by an application on a computing device. The application can be or include a security application or component, a web browser, or an SDK component of an application, just to name a few. Also, prior history of behavior of users, devices, apps, and/or browsers can be collected by a local DNS client or a network-resident DNS resolver, and/or via analysis of historical behavioral information collected on a server.

The collected historical behavioral data can be used upon a triggering event to perform multiple DNS resolutions in advance of an application or web browser actually sending such DNS requests. The prefetched DNS information can be used to populate a local DNS cache in a device so that DNS response information is already present when it is requested. This can save round trips of information gathering on a network to obtain and return such information during the actual need or use for the information. It moves the round trips ahead of the time such that the potential delay caused by the DNS resolution is reduced or minimized. This is also useful in that a computing device usually has a DNS cache and using DNS cache can cause problems in some instances and the computing device may have to flush the DNS cache to clear the problems (or wait until the cached entries expire). The prefetch operations upon a triggering event can also include clearing the DNS cache.

In some embodiments, the detection of a triggering event can result in the proactive issuance of multiple DNS requests. The requests can be for the DNS domain names known from history to be usually resolved as a result of the triggering event. Also, certain types of triggering events can be correlated to requests of DNS names, application names, certain links, etc.

A triggering event can include identifiers associated with it such as details of the triggering event, e.g., a device or user identifier, a geographical location, a time of date, etc. Such information can be correlated to DNS requests and can be sent in a DNS request as well.

Operations disclosed herein can also apply to private protocol requests, which use such provided information to perform multiple DNS requests from a private server. This can include consulting currently active DNS resolution information in its local cache and then returning one or more pieces of such DNS response information in one or more DNS responses or in a private protocol to a requesting component or device.

Previously collected history can be stored locally and securely on the computing device itself (such as a mobile device itself), or can exist on one or more servers in the cloud. Previously collected history can be collected and assigned a unique identifier which accompanies the sending of previously collected history to a server in the cloud. Prefetch requests can carry the previously assigned unique identifier, which the server in the cloud can use to determine what set of DNS response information is to be returned. A user's privacy can be maintained in such a situation by having the server in the cloud not correlate the unique identifier assigned with any user identifier.

In some embodiments, the sending of DNS response information can also include assessments regarding the security or content risk of particular domain names. For example, a domain name is a known phishing site or source of malware or unsafe according to an enterprise or personal computing policy.

Enterprise Policy for Allowable DNS Servers

Techniques for providing and using an enterprise policy for allowable DNS servers, are described herein.

Problems faced by conventional DNS prefetching can include accidental misconfiguration of DNS servers (such as via memory error) or willful misconfiguration of DNS servers by attackers. When a DNS server is misconfigured, it can resolve DNS requests incorrectly such that the requests are vulnerable to threat actors or the requests result in answers that include domains owned by threat actors. These are just some of the risks involved with misconfiguration of DNS servers. To put it another way, if a DNS server configured on a device is configured so as to be a different or non-authorized server, then DNS requests may be resolved by a potential attacker.

An application which makes network connections and relies upon accurate DNS resolution can be compromised if DNS requests are resolved by an inauthentic or mal-intentioned DNS server. In some examples, the application, or an organization which provided that application, can configure a policy which has a whitelist of allowable DNS servers to be used by the application. If the application detects that the currently configured DNS server is not one that is allowed by the policy, then the application can perform a security action accordingly. If the security application detects that the currently configured DNS server is not one that is allowed by policy, then the application can take one or more of the following actions, for example: do not perform DNS requests; do not create or use network connections; perform its own DNS resolutions using one or more pre-configured DNS server addresses; warn the user; and warn an administrator of the device.

A security application can use a policy configured by an organization, which has a whitelist of allowable DNS servers to be used by a specific list of applications, or by applications in a "work" profile of a device, or by applications in a "personal" profile of a device, or by any application on the device. If the security application detects that the currently configured DNS server is not one that is allowed by policy, then the security application can take one or more of the following actions: do not allow DNS requests to be performed; do not create or use network connections; perform DNS resolutions using one or more pre-configured DNS server addresses; warn the user; and warn an administrator of the device. In some embodiments, the security application can be a component of another application, or a component of the operating system, or a component of firmware for the baseband processor on a device.

In some embodiments, a policy, can include a whitelist of DNS servers for particular applications, or can include a whitelist of DNS servers to be used to resolve particular domain names or domain name wildcards, e.g., *.example-.com. If it is detected that the currently configured DNS server is not one that is allowed by policy for looking up a particular domain, then one or more of these actions can be taken: do not allow DNS requests to be performed; do not create or use network connections; perform DNS resolutions using one or more pre-configured DNS server addresses; warn the user; and warn an administrator of the device.

Enterprise Policy for Allowable Applications on a Private Network

Techniques for providing and using an enterprise policy for allowable applications on a private network, are described herein.

Another problem faced by conventional DNS prefetching, as well as fetching in general, is the instance of a malicious application running on a device connected to a private network or an enterprise's internal network. The threatening device can conduct surveillance on the private network (or enterprise's internal network) using DNS prefetching—and using link fetching in general. A potentially malicious application running on the device can run inside or be connected to an enterprise's internal network and thus conduct surveillance on stored data, data communications, application operations and device operations in the internal network. Information retrieved from such threat actors, which is often prefetched or fetched, may then be used for attacks on the private network. For instance, maliciously gained knowledge that certain named servers and IP addresses exist in a private network, by a surveillance application, is a serious security concern. Some other information that could be obtained by DNS requests can include DNS LOC resource record, which can include the location (latitude and longitude) of a server.

An enterprise may have a policy which determines whether apps running on a device are allowed to resolve names internal to a network while connected to an enterprise's network. An enterprise policy for whether an application can resolve internal enterprise names can be used. An enterprise can have a policy which determines whether apps running on a device are allowed to resolve names internal to a network while connected to an enterprise's network or private network. If the enterprise is "example.com" then the enterprise cannot wish for any application except ones on a whitelist pre-configured by the enterprise to issue DNS queries such as "payroll.example.com" or "hr.example.com" or "*.example.com" or for any name ending in ".local".

In some embodiments, a security component, a security application, or a component of the operating system can, when connected to an enterprise internal network, use a policy which determines whether apps running on a device are allowed to resolve names internal to a network. Upon the detection of an application not allowed to issue such a DNS request making one, then one or more of several actions can be taken, such as: kill (or terminate) the offending app; mark the device as being high-risk or non-compliant with policy, and send such a marking notification to an identity and access management (IAM) server, a mobile device management (MDM) server, or an enterprise mobility management (EMM) server, or other security or administrative server or piece of network infrastructure (e.g., a firewall, an intrusion detection or prevention server, or a network switch, etc.). Also, the actions can include: notifying an administrator of the enterprise; notifying the user of the device; preventing the DNS request; in a honeypot mode providing spurious responses to any such requests; and preventing the application from communicating on the network.

Bitsquatting Management

Bitsquatting is also a security concern. Bitsquatting is a form of cybersquatting that involves the registration of domain names likely to be the result of a random memory error in a computer requesting a corresponding authentic domain, e.g. excmple.com or exaeple.com for example.com. For instance, the error character 'c' has the binary representation (in ASCII, e.g.) of 0110 0010, whereas the correct character 'a' has the binary representation of 0110 0011; the binary representation of 'c' is "off by one bit" from the binary representation of 'a'.

Bitsquatting can also apply to DNS server addresses. For example, one of the GOOGLE Public DNS servers is IP address 8.8.8.8. Memory errors that change a bit happen all the time. A 1-bit memory error somewhere in the IP address for the aforesaid configured DNS server could lead to any of these sixteen addresses: [12,10,9,0]0.8.8.8, 8.[12,10,9,0].8.8, 8.8.[12,10,9,0].8, and 8.8.8.[12,10,9,0]. And, at least one of these may exists on the Internet and respond to pings, or more importantly, to DNS protocol requests. Thus, such an address that is off by a bit could be handling DNS requests that had been intended for the GOOGLE Public DNS servers with IP address 8.8.8.8.

It would be desirable to be able to detect (at the client) and prevent such problems for either DNS IP addresses or for Domain Names.

In some embodiments, bitsquatting can be remedied by detection and management operations for IP addresses and domain names as well as other DNS identifiers off by one bit. Single bit memory errors can occur often and attackers register the off-by-one domains to intercept requests to a legitimate server or domain.

Detection can occur by comparing first time used identifiers against a database of known DNS identifiers, to determine if a first time used identifier is similar to a known identifier except for one bit. If it is found that the new identifier is off by one bit from a known identifier than it can be tagged in a database. The tagged identifier can be specifically tagged for bitsquatting or quarantine until there is further evidence of bitsquatting. Certain security actions, such as any of the security-related actions mentioned herein can be used whenever a bitsquatting identifier is detected and/or tagged.

For example, if a security application detects a connection to an IP address which is a bitsquat (off-by-1 bit) of a well-known identifier (such as a commonly used or previously used DNS server or other previously used server), then security application can take one or more actions, which can include: warn user of the bitsquat; warn administrator of the device of the bitsquat; block connection to the IP address; make a connection instead to the well-known-identifier IP address that is almost the same as the bitsquat IP address. The warning can include details as to the IP address and the off-by-1 bit.

For a given domain, the security application can determine if any bitsquat names are registered, or if for the DNS resolved IP address for the domain, if any bitsquat (off-by-1 bit) IP addresses exist on the Internet, and if so, report them to an administrator for that domain and/or tag them for another type of security action in a database.

A provider of DNS servers can adopt a convention of only assigning DNS server IP addresses with an even number of ones in the binary form of an IP address. As a result, if there has been an off-by-1-bit error due to a memory error in a device, it can yield an IP address with an odd number of ones in the binary form of an IP address, and a component on the device, such as a security application, can determine immediately that there has been such a memory error and take any of the security related actions as described herein. Also, a provider of DNS servers can adopt a convention of only assigning DNS server IP addresses with an odd number of ones in the binary form of an IP address. As a result, if there has been an off-by-1-bit error due to a memory error in a device, it can yield an IP address with an even number of ones in the binary form of an IP address, and a component on the device, such as a security application, can determine immediately that there has been such a memory error and take any of the security related actions as described herein.

An Example System for DNS Prefetching Based on Application or Contextual Triggers FIG. 1 shows a system for DNS prefetching based on application or contextual triggers, including an application server 130, web server 140, proxy server 150, DNS server 160, a user terminal (e.g., one of terminals 141, 143, 145), and/or a mobile device (e.g., one of mobile devices 147 or 149), according to some embodiments. In FIG. 1, the user terminals 141, 143, and 145 and/or mobile devices 147 and 149 are used to access and/or communicate with application server 130, web server 140, proxy server 150, and DNS server 160 over a communication network 121 (e.g., the Internet, a wide area network, a local network, or other wired or wireless communications network).

Network 121 can be used to download and remotely install applications selected from the application server 130. The application server 130 can be part of a marketplace (e.g., using Google Play or the Android Market). Marketplace can include one or more web servers (or other types of data communication servers) to communicate with the user terminals 141, 143, and 145 and mobile devices 147 and 149. Also, network 121 can be used to access websites or web applications such as from the web server 140.

The proxy server 150 can be a transparent proxy server or a non-transparent proxy server.

The DNS Server 160 can provide DNS services and include a database of IP addresses and associated hostnames. It can also resolve or translate domain names to IP addresses as requested. The DNS Server 160 can assign domain names and map those names to Internet resources.

Mobile devices can include, for example, cell phones, smartphones, and tablet devices such as the iPhone device or an Android tablet. Mobile devices can also include automobiles, planes, or other vehicles that include a computing device, such as an embedded computing or communication system that communicates via the Internet over a cellular phone system, or other portable computing devices (e.g., devices that pair with a mobile device using Bluetooth, such as an Apple watch). The mobile devices communicate with the servers, websites and application marketplaces.

Additional examples of mobile devices include devices that are part of what is called "the internet of things" (IOT). In the IOT there are multiple devices which operate without accompanying and attendant users. Such devices can be mobile or sessile; they can have various sensors and computing and communication capabilities and can run applications; schematically they can be considered substantially similar to a mobile device. Such "things" can have occasional interactions with owners or administrators of the "things", who can monitor the things or modify settings on these things. Such owners or administrators play the role of users with respect to the "thing" devices. In some examples, the primary mobile device of a user can be an administrator server with respect to a paired "thing" device that is worn by the user (e.g., an Apple watch). In an embodiment, a "thing" or a device, e.g., one intended for use as a health or medical device, can have an embedded whitelist defining trusted sources for applications, or can have an administrator associated with that device.

Operations of the methods 200, 300, 400, 500, and 600 can be performed by any one of the various systems described herein, which includes a non-transitory computer readable medium having instructions which when executed by a processor on a data processing system can cause the processor and/or the system to perform any one of the operations. For example, in some operations of the methods can be performed by DNS server 160 and/or the computing device 701 illustrated in FIG. 7, and some other operations of the methods can be performed by one of the user terminals or mobile devices illustrated in FIG. 1 and/or the computing device 801 illustrated in FIG. 8.

The operations of the methods can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

Although shown in a particular sequence or order, unless otherwise specified, the order of the operations of the methods described herein can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other process flows are possible.

Example Methods for DNS Prefetching Based on Application or Contextual Triggers

Figure 2:
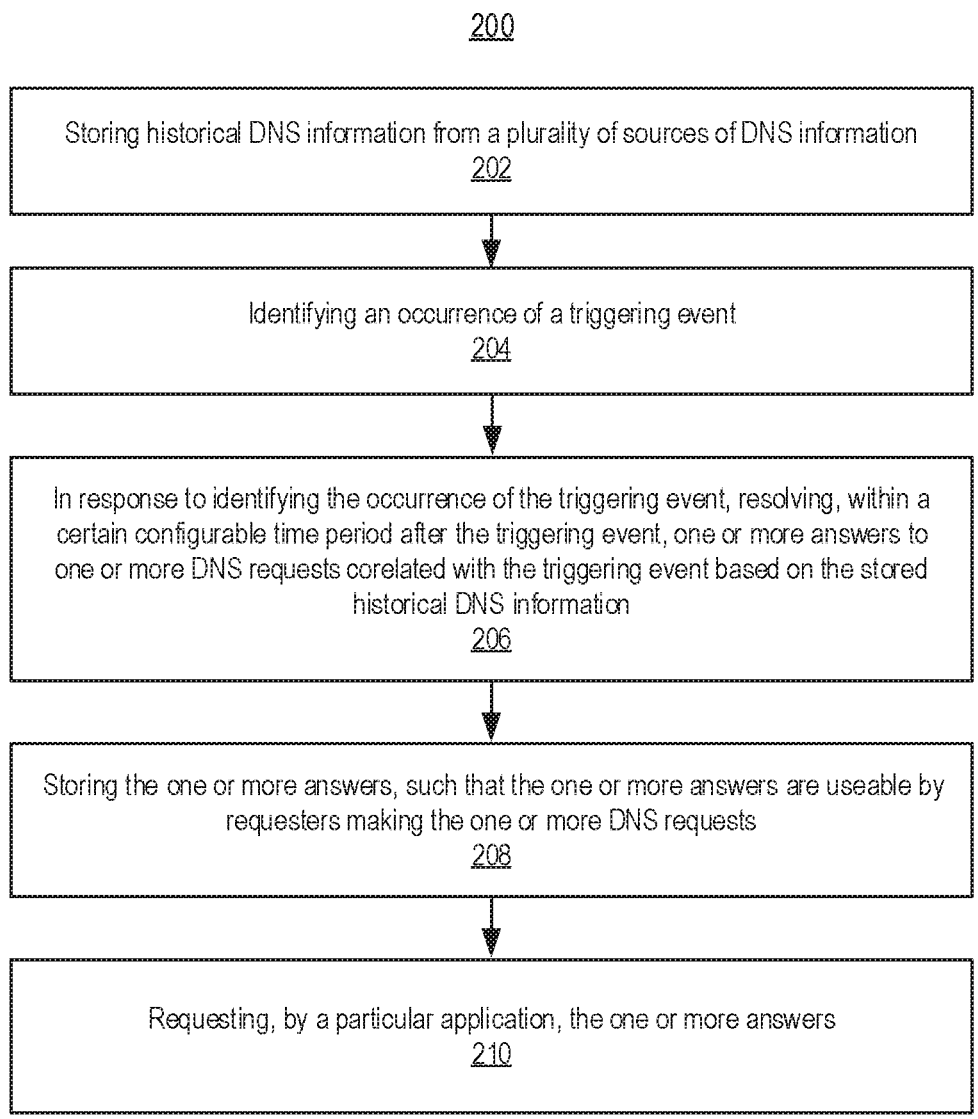
FIG. 2 shows an example method 200 for DNS prefetching based on application or contextual triggers, according to some embodiments.

FIG. 2 shows an example method 200 for DNS prefetching based on application or contextual triggers, according to some embodiments. In some embodiments, a security application or another type of component running on a computing device can determine triggering events that can be used to activate DNS prefetching.

In some embodiments, prior history of behavior of a user with a device (or prior history of device behavior of users in general or particular types of users in general), prior history of behavior of a downloaded app, and/or prior history of behavior of a browser can be collected by an application on a computing device. The application can be or include a security application or component, a web browser, or a SDK component of an application, just to name a few. Also, prior history of behavior of users, devices, apps, and/or browsers can be collected by a local DNS client or a network-resident DNS resolver, and/or via analysis of historical behavioral information collected on a server.

The collected historical behavioral data can be used upon a triggering event to perform multiple DNS resolutions in advance of an application or web browser actually sending such DNS requests. The prefetched DNS information can be used to populate a local DNS cache in a device so that DNS response information is already present when it is requested. This can save round trips of information gathering on a network to obtain and return such information during the actual need or use for the information. It moves the round trips ahead of the time such that the potential delay caused by the DNS resolution is reduced or minimized.

At block 202, one or more computing devices store historical DNS information from a plurality of sources of DNS information. The historical DNS information can include a plurality of historical DNS requests and a plurality of triggering events correlated to the plurality of historical DNS requests. The plurality of sources of DNS information can include one or more DNS servers, one or more proxy servers (such as one or more transparent proxy servers), one or more web servers or application servers, one or more end-user devices (such as one or more user terminals or mobile devices). For example, the proxy server 150 and/or the DNS server 160 can be source(s) of the DNS information. Also, DNS resolutions can be configured such that DNS information comes from trusted DNS servers.

At block 204, a processor or one or more sensors identify an occurrence of a triggering event of the plurality of triggering events. The one or more sensors can be in the one or more computing devices, attached to the one or more computing devices, connected to the one or more computing devices by one or more network links (such as via network 121), or any combination thereof. The processor can be in the one or more computing devices.

In the examples with end-user devices, a security application can monitor communications interfaces of the device for DNS information. The security application can also provide a way to validate parts of the DNS information. A security application can also be used by any one of the servers described herein to validate parts of the DNS information. For example, even if the security application cannot detect a known actor making a DNS request, there are usual requests that requesters make for a specific website or app, and the security application can have the device look at those requests to see if any of the requests include blacklisted URLs or domains.

The DNS information can be related to each website or application in general or have specific relationships with respect to each website or application and specific types of end users. Such as users that use certain types of devices or browsers or have certain types of behavioral attributes. Also, the devices described herein can be used to retrieve DNS information that is encrypted.

A triggering event of the plurality of triggering events can be correlated to at least one historical DNS request of the plurality of historical DNS requests. The triggering event can be prior to the at least one historical DNS request. The triggering event can include an initiation of an execution of a particular application. For example, the triggering event can include initiation of an execution of a particular application by the computing device(s) that store the historical DNS information or other computing device(s).

The correlation between the triggering event and the at least one historical DNS request can be configurable. For example, the correlation can include a prediction that can be made and configured between a triggering event and a DNS request when a certain probability of the triggering event causing a DNS request occurs in the historical DNS information. For example, if historically a triggering event causes at least one historical DNS request to occur over 90% of the time, then a prediction can be made between the triggering event and the at least one historical DNS request. The certain percentage or confidence level between events to create a prediction between the events in the historical DNS information can be configurable as well. Also, for example, from historical data, it can be predicted that when a user opens an application or a certain action of the user is sensed, the user has 90% probability to visit a list of sites. Thus, in response to opening the application or a certain event being sensed, the IP addresses of the sites predicted for visitation are resolved in DNS pre-fetching.

In some embodiments, the triggering event can include an event identifiable by a computing device that is configured to run a particular application, and the triggering event occurs before the one or more particular DNS requests of the particular application at least a certain percentage of the time. In such embodiments, the certain percentage is configurable. Also, the certain percentage that is configurable can be a configurable range of percentages. For example, the configuration can be for when the triggering event occurs before the one or more particular DNS requests at least 90% of the time.

The one or more computing devices can include a server (such as any one of the servers depicted in FIG. 1), a mobile device (such as any one of the mobile devices depicted in FIG. 1), or a network device such as the proxy server 150 or the DNS server 160 depicted in FIG. 1. In the case of a network device, the network device can be an intermediate device communicatively coupled to a mobile device and a server over a network, such as a proxy server.

In some embodiments, the historical DNS information can further include a plurality of DNS answers. In such embodiments, a group of the plurality of triggering events can be further correlated to the plurality of historical DNS answers. A triggering event of the group can be correlated to at least one historical DNS answer of the plurality of historical DNS answers. In such examples, the triggering event occurs prior to at least one historical DNS request of the plurality of historical requests corresponding to the at least one historical DNS answer. And, in such embodiments, the resolving of the one or more answers to the one or more DNS requests can be based on one or more historical DNS answers of the plurality of historical DNS answers corresponding to the one or more DNS requests when the one or more historical DNS answers have an unexpired time to live (TTL).

In some embodiments, using the DNS information gathered and stored, an end-user device, such as a user terminal or mobile device, can proactively prefetch DNS information for requests. The DNS information can already have been stored on the end-user device or another proximate computing device. The likely requests to be made by a web browser or application can be requests correlated to triggers, such as environmental triggers sensed by a part of the end-user device or a computing device or sensor communicatively coupled to the end-user device—such a sensing device connected to the end-user device through a network.

Regarding the DNS information, DNS lookups can correspond to predicted other lookups that follow the DNS lookups. And, the predicted other lookups to follow can be based on algorithms that predict what is likely to come next. The predicted lookups can be based on configurable algorithms. For example, the procedures can be configured for predicting lookups that are at least 90% likely to occur after a predecessor lookup.

The information from the initial lookups and the predicted following lookups can be stored in or with the DNS information in end-user devices and/or servers. Such information can also be cached by end-user devices and/or servers. This way such information is available with the stored DNS information for when correlated triggers occur, so that such information can be retrieved immediately after a triggering event in advance of usual fetching for such information.

When a trigger occurs, the end-user device, for example, can have the information in advance so that other requests can be made in parallel. The end-user device or the connected server (such as a proxy server or DNS server) can then do even further lookups.

The triggers can occur in or be sensed by the end-user device or a connected sensor or computing device, and the end-user device or another connected device (such as a connected sever) can perform the prefetching, in advance, according to triggers. The device running the prefetch can be restricted to only prefetching if a DNS resolution is not stored and/or cached for or in the device. It cannot be effective to prefetch DNS information that is already stored or cached. Upon a triggering even, requests and/or answers are retrieved from local storage and/or cache and/or retrieved recursively up a chain of DNS and/or proxy servers until getting an authoritative DNS server for certain requested domains. In general, the DNS information is sent back to the device and the information sent back can include IP addresses and time to live (TTL) information for the addresses. This retrieved information can then be further stored by local storage or caches for subsequent prefetching based on triggers.

Some triggering events can be application events that can be identified by a processor, e.g., the launch of a particular application, or a DNS request issued by a particular application, e.g., the first DNS request that an application can issue after launching. Other triggering events can be sensed events sensed by one or more sensors, e.g., a user of a mobile device picks up the device which had been at rest on a surface or in a pocket, and the pick-up event is sensed by one or more sensors of the device such as an accelerometer and gyroscope sensor in the device. Other triggers can include unlocking of a computing device by a user, or swiping to a screen including an icon of an application that is likely to be executed after the swipe.

A user of a computing device can have a pattern of behavior with the device and applications loaded on the device. Also, a user of a web browser of a device can have a pattern of visiting certain websites via the browser shortly after activating the browser and/or picking up and unlocking the computing device.

Triggers can also be or include geographic and/or temporal trigger events. For example, a computing device nearing or arriving at a particular location, such as the user's work or home location, during a particular day or time of the week, can be a triggering event associated with a particular prefetch of DNS information. This is helpful, in that a user of a device can have a normal pattern of behavior to use certain applications on a device or visit certain websites via a browser shortly after one or more of geographic and/or temporal triggering events. The prefetch, or a fetch in general, executed after a triggering event allows gathering of resources prior to use of an application or browser even earlier than conventional prefetches.

At block 206, in response to identifying the occurrence of the triggering event, computing devices(s), such as the computing device(s) that store the historical DNS information, resolve one or more answers to one or more DNS requests correlated with the triggering event based on the stored historical DNS information. The resolving of the one or more answers can occur within a certain configurable time period after the triggering event.

At block 208, computing devices(s), such as the computing device(s) that store the historical DNS information, store the one or more answers. The answer(s) are stored such that the answer(s) are useable by requesters making the one or more DNS requests. The storing of the one or more answers, at block 208, can occur during loading or preloading of resources of an application or a website.

In some embodiments, the detection of a triggering event can result in the proactive issuance of multiple DNS requests. The requests can be for the DNS domain names known from history to be usually resolved as a result of the triggering event. Also, certain types of triggering events can be correlated to requests of DNS names, application names, certain links, etc.

A triggering event can include identifiers associated with it such as details of the triggering event, e.g., a device or user identifier, a geographical location, a time of date, etc. Such information can be correlated to DNS requests and can be sent in a DNS request as well.

Operations disclosed herein can also apply to private protocol requests, which use such provided information to perform multiple DNS requests from a private server. This can include consulting currently active DNS resolution information in its local cache and then returning one or more pieces of such DNS response information in one or more DNS responses or in a private protocol to a requesting component or device.

Previously collected history can be stored locally and securely on the computing device itself (such as a mobile device itself), or can exist on one or more servers in the cloud. Previously collected history can be collected and assigned a unique identifier which accompanies the sending of previously collected history to a server in the cloud. Prefetch requests can carry the previously assigned unique identifier, which the server in the cloud can use to determine what set of DNS response information is to be returned. A user's privacy can be maintained in such a situation by having the server in the cloud not correlate the unique identifier assigned with any user identifier.

In some embodiments, the sending of DNS response information can also include assessments regarding the security or content risk of particular domain names. For example, a domain name is a known phishing site or source of malware or unsafe according to an enterprise or personal computing policy.

Finally, at block 210, a particular application requests the one or more answers. The particular application can run on one or more computing devices, such as the computing device(s) that store the historical DNS information.

In some embodiments, the particular application can be or include a web browser. In such embodiments, the one or more answers can be answers to the one or more DNS requests that include DNS requests for an initial rendering of a web page or website—such as a website served from web server 140.

In some embodiments, the particular application can be a downloadable mobile application—such as an application downloaded from application server 130. In such embodiments, the one or more answers can include answers to the one or more DNS requests. The one or more DNS requests can include DNS requests for an initial rendering of the downloadable mobile application after it is downloaded by one or more computing devices (such as the computing device(s) that store the historical DNS information).

In some embodiments, a transparent proxy connected to or running on computing device(s)—such as the computing device(s) that store the historical DNS information—can retrieve DNS information used in an initial rendering of a website. In such examples, the computing device(s) can store, with the stored historical DNS information, the retrieved DNS information used in the initial rendering of the website.

In some embodiments, a transparent proxy connected to or running on computing device(s)—such as the computing device(s) that store the historical DNS information—can retrieve DNS information used in a startup process of a downloaded mobile application. In such examples, the computing device(s) can store, with the stored historical DNS information, the retrieved DNS information used in the startup process of the downloaded mobile application.

FIG. 3 shows another example method 300 for DNS prefetching based on application or contextual triggers, according to some embodiments. In the examples of FIG. 3, assessments of the DNS information are also retrieved and used. In some embodiments, a device cannot just prefetch IP addresses and domains but also assessments of such information as to whether the information is authentic or provided by threat actors. If such information is found to be suspicious or inauthentic, certain security measures can be taken. Such steps can occur through servers and/or end-user devices.

At block 302, one or more computing devices store historical DNS information from a plurality of sources of DNS information. The historical DNS information can include a plurality of historical DNS requests and a plurality of triggering events correlated to the plurality of historical DNS requests. The plurality of sources of DNS information can include a DNS server—such as DNS server 160. Also, at block 302, the one or more computing devices store, with the historical DNS information, assessments for each of the plurality of historical DNS requests. Similarly, a triggering event of the plurality of triggering events can be correlated to at least one historical DNS request of the plurality of historical DNS requests. The triggering event can be prior to the at least one historical DNS request. Also, the correlation between the triggering event and the at least one historical DNS request can be configurable and can include a configurable prediction.

At block 304, a processor or one or more sensors identify an occurrence of a triggering event of the plurality of triggering events. The one or more sensors can be in the one or more computing devices, attached to the one or more computing devices, connected to the one or more computing devices by one or more network links (such as via network 121), or any combination thereof. The processor can be in the one or more computing devices.

At block 306, in response to identifying the occurrence of the triggering event, computing devices(s), such as the computing device(s) that store the historical DNS information, resolve one or more answers to one or more DNS requests correlated with the triggering event based on the stored historical DNS information. The resolving of the one or more answers can occur within a certain configurable time period after the triggering event.

In some embodiments, the DNS response information can also include assessments regarding the security or content risk of particular domain names in the DNS information. For example, a domain name can be determined as a known phishing site or source of malware or unsafe according to an enterprise or personal computing policy.

Additionally, at block 306, in response to identifying the occurrence of the triggering event, the computing devices(s), such as the computing device(s) that store the historical DNS information, determine a legitimacy level of the one or more answers to the one or more DNS requests correlated with the triggering event based on the assessments. For example, in response to identifying the occurrence of the triggering event, the computing devices(s) determine a probability that the one or more answers to the one or more DNS requests are or include phishing attack(s), based on the assessments.

At block 308, computing devices(s), such as the computing device(s) that store the historical DNS information, act on the one or more answers according to the determined legitimacy level of the one or more answers. At block 310, a particular application requests the one or more answers. The particular application can run on one or more computing devices, such as the computing device(s) that store the historical DNS information.

In some embodiments, the acting on the one or more answers can include the storing of the one or more answers when the determined legitimacy level of the one or more answers exceeds a predetermined threshold. In such examples, the acting on the one or more answers can include modifying the one or more answers and storing the one or more modified answers, such that the one or more modified answers are useable by requesters making the one or more DNS requests, when the determined legitimacy level of the one or more answers does not exceed the predetermined threshold. Also, in such examples, the acting on the one or more answers can include blocking the one or more answers, such that the one or more answers are not accessible by requesters making the one or more DNS requests, when the determined legitimacy level of the one or more answers does not exceed the predetermined threshold.

In some embodiments, the predetermined threshold can be updated according to the accuracy of the one or more answers. For example, if the threshold level is set to 80% match and the one or more answers are inaccurate most of the time, the threshold level can be increased to a higher percentage. Also, for example, if the threshold is set to 60% match and the one or more answers is accurate all (or nearly all) of the time then the threshold level can be decreased to a lower percentage. In some embodiments, the threshold can be associated with and updated according to actions of the user and/or the application. For example, the same user can be associated with an 80% threshold on one application and a 60% threshold on a second application.

FIG. 4 shows another example method 400 for DNS prefetching based on application or contextual triggers, according to some embodiments.

At block 402, one or more computing devices store historical DNS information from a plurality of sources of DNS information. The historical DNS information can include a plurality of historical DNS requests and a plurality of triggering events correlated to the plurality of historical DNS requests. The plurality of sources of DNS information can include a DNS server—such as DNS server 160. Also, at block 402, the one or more computing devices store, with the historical DNS information, assessments for each of the plurality of historical DNS requests. Similarly, a triggering event of the plurality of triggering events can be correlated to at least one historical DNS request of the plurality of historical DNS requests. The triggering event can be prior to the at least one historical DNS request. Also, the correlation between the triggering event and the at least one historical DNS request can be configurable and can include a configurable prediction.

At block 404, a processor or one or more sensors identify an occurrence of a triggering event of the plurality of triggering events. The one or more sensors can be in the one or more computing devices, attached to the one or more computing devices, connected to the one or more computing devices by one or more network links (such as via network 121), or any combination thereof. The processor can be in the one or more computing devices.

At block 406, in response to identifying the occurrence of the triggering event, computing devices(s), such as the computing device(s) that store the historical DNS information, resolve one or more answers to one or more DNS requests correlated with the triggering event based on the stored historical DNS information. The resolving of the one or more answers can occur within a certain configurable time period after the triggering event.

Additionally, at block 406, in response to identifying the occurrence of the triggering event, the computing devices(s), such as the computing device(s) that store the historical DNS information, determine a legitimacy level of the triggering event based on the assessments. For example, in response to identifying the occurrence of the triggering event, the computing devices(s) determine a probability that the one or more answers to the one or more DNS requests are or include phishing attack(s), based on the assessments.

At block 408, the computing devices(s), such as the computing device(s) that store the historical DNS information, act on the one or more answers according to the determined legitimacy level of the triggering event.

At block 410, a particular application requests the one or more answers. The particular application can run on one or more computing devices, such as the computing device(s) that store the historical DNS information.

The methods 200, 300, and 400 can be combined in various ways. For example, in some embodiments, the acting on the one or more answers can include storing the one or more answers, when the respective determined legitimacy levels of the one or more answers and triggering event each exceed a predetermined threshold. Also, for example, the acting on the one or more answers can include modifying the one or more answers and storing the one or more modified answers, such that the one or more modified answers are useable by requesters making the one or more DNS requests, when each of the respective determined legitimacy levels of the one or more answers and triggering event do not exceed a predetermined threshold. Also, for example, the acting on the one or more answers can include blocking the one or more answers, such that the one or more answers are not accessible by requesters making the one or more DNS requests, when each of the respective determined legitimacy levels of the one or more answers and triggering event do not exceed a predetermined threshold.

In some embodiments, the methods of 200, 300, and 400, or any combination thereof, can be implemented by multiple computing devices. For example, some embodiments can include a system with a first computing device and a second computing device connected over a network. In such embodiments, the first computing device can include a processor and a non-transitory computer-readable storage medium for tangibly storing thereon program logic for execution by the processor of the first computing device. The program logic of the first computing device can include executable logic for storing historical DNS information from a plurality of sources of DNS information. The historical DNS information can include a plurality of historical DNS requests and a plurality of triggering events correlated to the plurality of historical DNS requests. A triggering event of the plurality of triggering events can be correlated to at least one historical DNS request of the plurality of historical DNS requests. The triggering event can prior to the at least one historical DNS request, and the correlation between the triggering event and the at least one historical DNS request can be configurable and can include a configurable prediction.

Also, in such embodiments, the second computing device (which is communicatively coupled to the first computing device) can include a processor and a non-transitory computer-readable storage medium for tangibly storing thereon program logic for execution by the processor of the second computing device. The program logic of the second computing device can include executable logic for identifying, via a processor or one or more sensors, an occurrence of a triggering event of the plurality of triggering events. The one or more sensors can be in the second computing device, attached to the second computing device, connected to the second computing device by a network link, or any combination thereof. The processor can be in the second computing device. The program logic of the second computing device can also include executable logic for, in response to identifying the occurrence of the triggering event, resolving, within a certain configurable time period after the triggering event, one or more answers to one or more DNS requests correlated with the triggering event based on the stored historical DNS information. It can also include executable logic for storing the one or more answers, such that the one or more answers are useable by requesters making the one or more DNS requests. This can be for during loading or preloading of resources of an application or one or more web pages. It can also executable logic for hosting a particular application, running on the second computing device, that requests the one or more answers.

In some embodiments, the methods of 200, 300, and 400, or any combination thereof, can be implemented by or in a single computing device. For example, a non-transitory computer-readable storage medium tangibly encoded with computer-executable instructions can be part of a single computing device. The medium, when executed by a processor of the computing device, can perform any one of the methods 200, 300, or 400, or any combination thereof. Also, the methods of 200, 300, and 400, or any combination thereof, can be implemented by or in multiple computing devices. For example, a non-transitory computer-readable storage medium tangibly encoded with computer-executable instructions can be part of multiple computing devices. The medium, when executed by one or more processors associated with the computing devices, can perform any one of the methods 200, 300, or 400, or any combination thereof.

Example Methods Using an Enterprise Policy for Allowable DNS Servers

FIG. 5 shows an example method 500 for validating and acting accordingly on DNS prefetching based on application or contextual triggers, according to some embodiments.

In some embodiments, enterprise policies for allowable DNS servers can be used. Such policies can be used with the operations of FIG. 5, especially the operations at blocks 504, 506, and 508. An application which makes network connections and relies upon accurate DNS resolution can be compromised if DNS requests are resolved by an inauthentic or mal-intentioned DNS server. In some examples, the application, or an organization which provided that application, can configure a policy which has a whitelist of allowable DNS servers to be used by the application.

At block 502, one or more computing devices, such as the computing device(s) that store the historical DNS information, identify an occurrence of a triggering event correlated with one or more DNS requests. A triggering event can be prior to the request(s) and can include an initiation of an execution of a particular application—such as an initiation of an execution of a particular application by the computing device(s) that store the historical DNS information or other computing device(s). Also, the triggering event can include or be an event sensed by one or more sensors—such as one or more sensors of the computing device(s) that store the historical DNS information. The correlation between the triggering event and the at least one historical DNS request can be configurable and can include a configurable prediction. And, the one or more computing devices can include a server (such as any one of the servers depicted in FIG. 1), a mobile device (such as any one of the mobile devices depicted in FIG. 1), or a network device such as the proxy server 150 or the DNS server 160 depicted in FIG. 1. In the case of a network device, the network device can be an intermediate device communicatively coupled to a mobile device and a server over a network, such as a proxy server.

At block 504, one or more computing devices, such as the computing device(s) that store the historical DNS information, in response to identifying the occurrence of the triggering event, resolve one or more DNS answers to the one or more DNS requests.

At block 506, one or more computing devices, such as the computing device(s) that store the historical DNS information, determine that a part of the one or more answers or the one or more DNS requests is missing from a list of acceptable parts of a DNS answer or a DNS request. At block 506, the list includes a list of allowable DNS servers to be used by a specific list of applications specified in a profile of a computing device and/or a profile of a computer network. Also, the part missing from the list is a particular DNS server. For example, in some embodiments, one or computing devices, or an organization which provides the computing device(s), can configure a policy which has a whitelist of allowable DNS servers to be used by the computing device (s). If the computing device(s) detect that the currently configured DNS server is not one that is allowed by the policy, then the computing device(s) can perform a particular action, such as security action, according to the detection.

At block 508, one or more computing devices, such as the computing device(s) that store the historical DNS information, in response to the determining that the part is missing from the list, perform a particular action. The particular action can include prohibiting use or creation of a network connection with the particular DNS server. The particular action can include resolving one or more DNS answers using one or more predetermined DNS server addresses that does not include an address of the particular DNS server. The particular action can include communicating a warning of the particular DNS server to a computing device making one of the one or more DNS requests. The particular action can include communicating a warning of the particular DNS server to a computing device of a system administrator administrating a computing device making one of the one or more DNS requests.

In some embodiments, if the one or more computing devices or the security application detects that the currently configured DNS server is not one that is allowed by policy, then the application can take one or more of the following actions, for example: do not perform DNS requests; do not create or use network connections; perform its own DNS resolutions using one or more pre-configured DNS server addresses; warn the user; and warn an administrator of the device.

A security application can use a policy configured by an organization, which has a whitelist of allowable DNS servers to be used by a specific list of applications, or by applications in a "work" profile of a device, or by applications in a "personal" profile of a device, or by any application on the device. If the security application detects that the currently configured DNS server is not one that is allowed by policy, then the security application can take one or more of the following actions: do not allow DNS requests to be performed; do not create or use network connections; perform DNS resolutions using one or more pre-configured DNS server addresses; warn the user; and warn an administrator of the device. In some embodiments, the security application can be a component of another application, or a component of the operating system, or a component of firmware for the baseband processor on a device.

In some embodiments, a policy, can include a whitelist of DNS servers for particular applications, or can include a whitelist of DNS servers to be used to resolve particular domain names or domain name wildcards, e.g., *.example.com. If it is detected that the currently configured DNS server is not one that is allowed by policy for looking up a particular domain, then one or more of these actions can be taken: do not allow DNS requests to be performed; do not create or use network connections; perform DNS resolutions using one or more pre-configured DNS server addresses; warn the user; and warn an administrator of the device.

Figure 6:
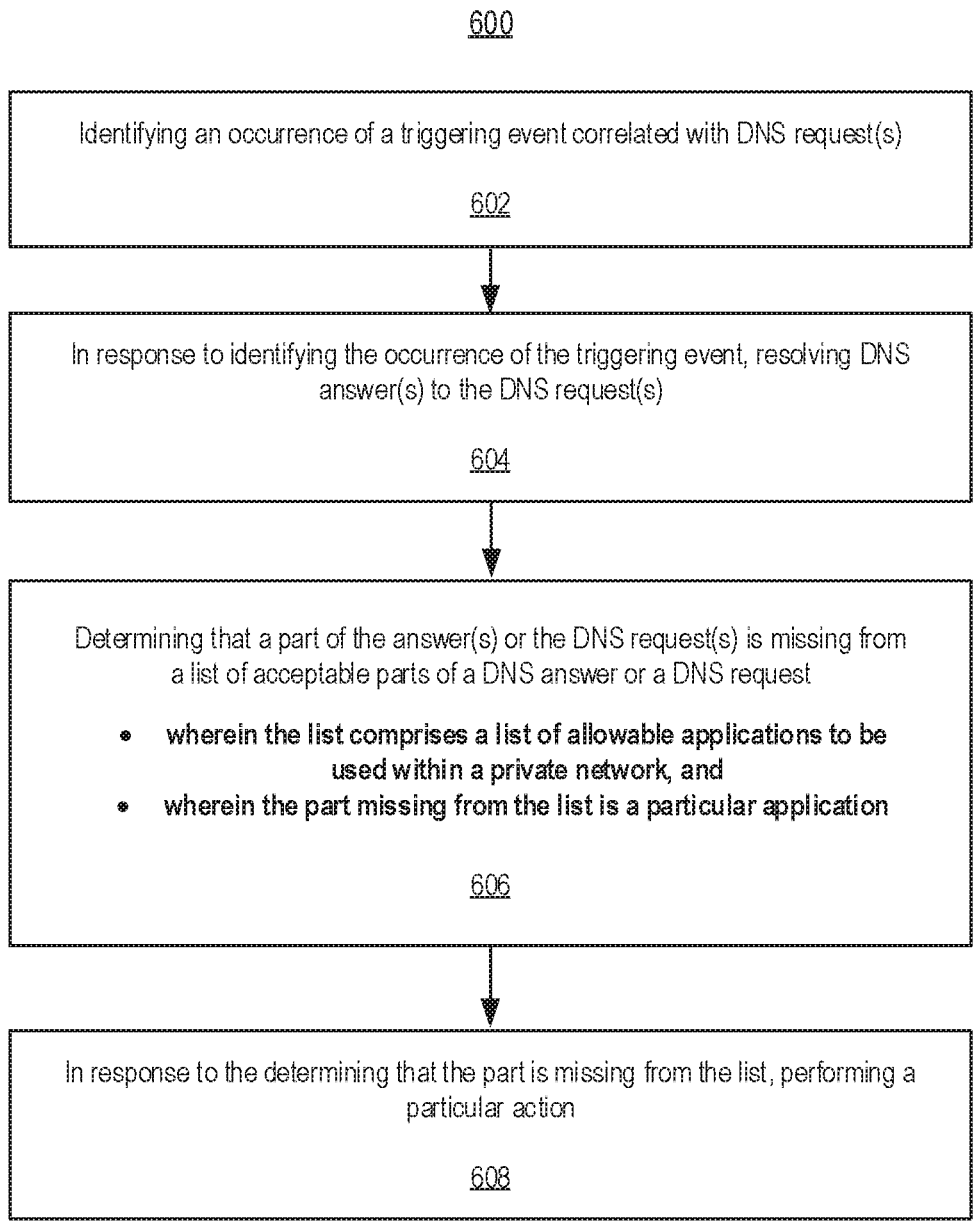
FIG. 6 shows another example method 600 for validating and acting accordingly on DNS prefetching based on application or contextual triggers, according to some embodiments.

Example Methods Using an Enterprise Policy for Allowable Applications on a Private Network FIG. 6 shows another example method 600 for validating and acting accordingly on DNS prefetching based on application or contextual triggers, according to some embodiments. As shown, block 602 include similar operations to block 502 of FIG. 5. Also, as shown, blocks 504 and 604 are similar.

At block 606, one or more computing devices, such as the computing device(s) that store the historical DNS information, determine that a part of the one or more answers or the one or more DNS requests is missing from a list of acceptable parts of a DNS answer or a DNS request. At block 606, the list includes a list of allowable applications to be used within a private network. Also, the part missing from the list is a particular application. For example, in some embodiments, one or computing devices, or an organization which provides the computing device(s), can configure a policy which has a whitelist of applications that are allowed to resolve names internal to an enterprise's internal or private network while connected to the network. To put it another way, an enterprise may have a policy which determines whether apps running on a device are allowed to resolve names internal to an internal and/or private network while connected to the network. If the computing device(s) detect that the application is not allowed to resolve names internal to an enterprise's internal or private network, then the computing device(s) can perform a particular action, such as security action, according to the detection.

In some embodiments, the list of allowable applications can include a list of corresponding uniform resource locators. And, the list of corresponding uniform resource locators can include complete uniform resource locators and partial uniform resource locators having domain name wildcards.

At block 608, one or more computing devices, such as the computing device(s) that store the historical DNS information, in response to the determining that the part is missing from the list, perform a particular action. The particular action can include prohibiting resolution, by the particular application, of addresses internal to the private network. The particular action can include terminating execution of the particular application. The particular action can include tagging the particular application or a computing device running the particular application as being noncompliant with the list of allowable applications. The particular action can include communicating a warning of the tagging to a computing device of a system administrator administrating the computing device running the particular application and to a user interface device of or connected to the computing device running the particular application. The particular action can include providing for a honeypot resolution, by the particular application, of addresses internal to the private network that are used for isolating and monitoring applications that are noncompliant with the list of allowable applications. The particular action can include prohibiting the particular application from communicating with the private network. The particular action can include prohibiting the particular application from performing DNS requests.

In some embodiments, an enterprise policy for whether an application can resolve internal enterprise names can be used. An enterprise can have a policy which determines whether apps running on a device are allowed to resolve names internal to a network while connected to an enterprise's network. If the enterprise is "example.com" then the enterprise cannot wish for any application except ones on a whitelist pre-configured by the enterprise to issue DNS queries such as "payroll.example.com" or "hr.example.com" or "*.example.com" or for any name ending in ".local".

In some embodiments, a security component, a security application, or a component of the operating system can, when connected to an enterprise internal network, use a policy which determines whether apps running on a device are allowed to resolve names internal to a network. Upon the detection of an application not allowed to issue such a DNS request making one, then one or more of several actions can be taken, such as: kill (or terminate) the offending app; mark the device as being high-risk or non-compliant with policy, and send such a marking notification to an identity and access management (IAM) server, a mobile device management (MDM) server, or an enterprise mobility management (EMM) server, or other security or administrative server or piece of network infrastructure (e.g., a firewall, an intrusion detection or prevention server, or a network switch, etc.). Also, the actions can include: notifying an administrator of the enterprise; notifying the user of the device; preventing the DNS request; in a honeypot mode providing spurious responses to any such requests; and preventing the application from communicating on the network.

The methods 500 and 600 as well as methods 200, 300, and 400 and any other method described herein can be combined in various ways. In some embodiments, the methods of 200, 300, 400, 500 and 600, as well as any other method described herein, or any combination thereof, can be implemented by multiple computing devices. And, in some embodiments, the methods of 200, 300, 400, 500 and 600, as well as any other method described herein, or any combination thereof, can be implemented by or in a single computing device.

Example Computing Devices According to Some Embodiments

Figure 7:
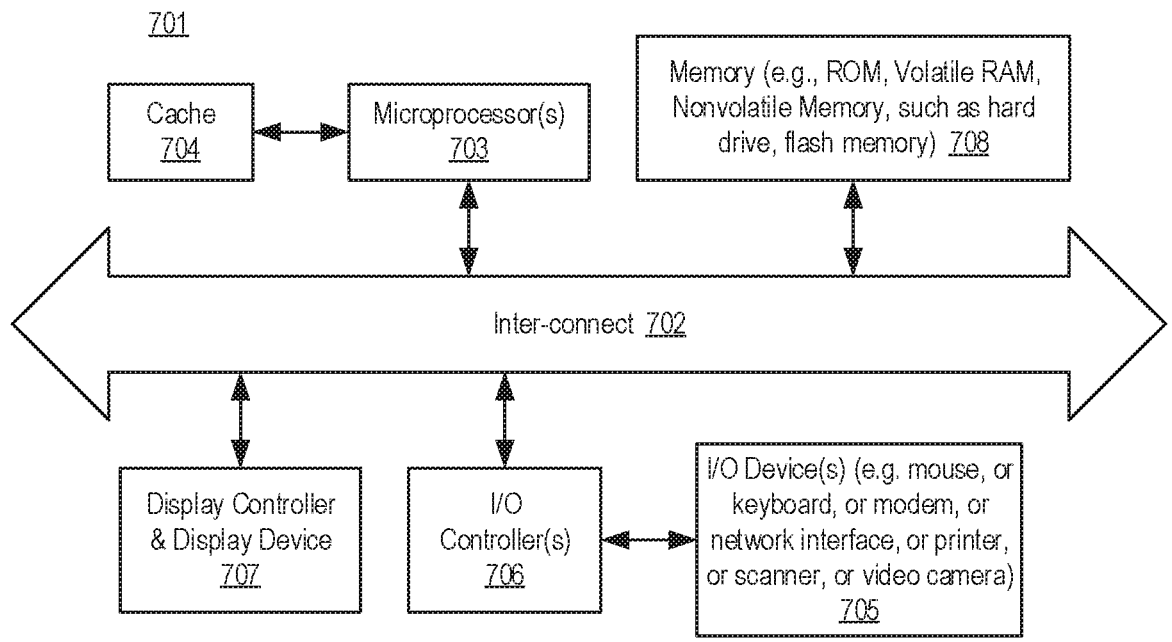
FIG. 7 shows a block diagram of a computing device (e.g., any one of the servers described herein), according to some embodiments.

FIG. 7 shows a block diagram of a computing device 701 (e.g., any one of the servers described herein), according to some embodiments. While FIG. 7 illustrates various components, it is not intended to represent any particular architecture or manner of interconnecting the components. Other systems that have fewer or more components can also be used. In an embodiment, any one of the servers of FIG. 1 can each reside on separate computing systems, or one or more can run on the same computing device, such as computing device 701, in various combinations.

In FIG. 7, computing device 701 includes an inter-connect 702 (e.g., bus and system core logic), which interconnects microprocessor(s) 703 and memory 708. The microprocessor(s) 703 are coupled to cache memory 704.

The inter-connect 702 interconnects the microprocessor(s) 703 and the memory 708 together and also interconnects them to a display controller and display device 707 and to peripheral devices such as input/output (I/O) devices 705 through input/output controller(s) 706. Typical I/O devices include mice, keyboards, modems, network interfaces, printers, scanners, video cameras and other devices which are well known in the art.

The inter-connect 702 can include one or more buses connected to one another through various bridges, controllers and/or adapters. In some embodiments, the I/O controller(s) 706 can include a USB (Universal Serial Bus) adapter for controlling peripherals. The I/O controller(s) 706 can also include an interface for USB connectors such as type-A, type-B, mini-USB, micro-USB, and Type-C. In some embodiments, the I/O controller(s) 706 can include an adapter for controlling lightning peripherals.

The memory 708 can include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory can also be random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In some embodiments, a computing device as illustrated in FIG. 7 is used to implement the servers illustrated in FIG. 1 and/or other servers described herein.

In another embodiment, a computing device as illustrated in FIG. 7 is used to implement a user terminal or a mobile device such as anyone of the end user devices described herein. A user terminal can be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device such as the computing device 701.

Embodiments of the disclosure can be implemented via the microprocessor(s) 703 and/or the memory 708. For example, the functionalities described can be partially implemented via hardware logic in the microprocessor(s) 703 and partially using the instructions stored in the memory 708. Some embodiments are implemented using the microprocessor(s) 703 without additional instructions stored in the memory 708. Some embodiments are implemented using the instructions stored in the memory 708 for execution by one or more general purpose microprocessor(s) 703. Thus, the disclosure is not limited to a specific configuration of hardware and/or software.

Figure 8:
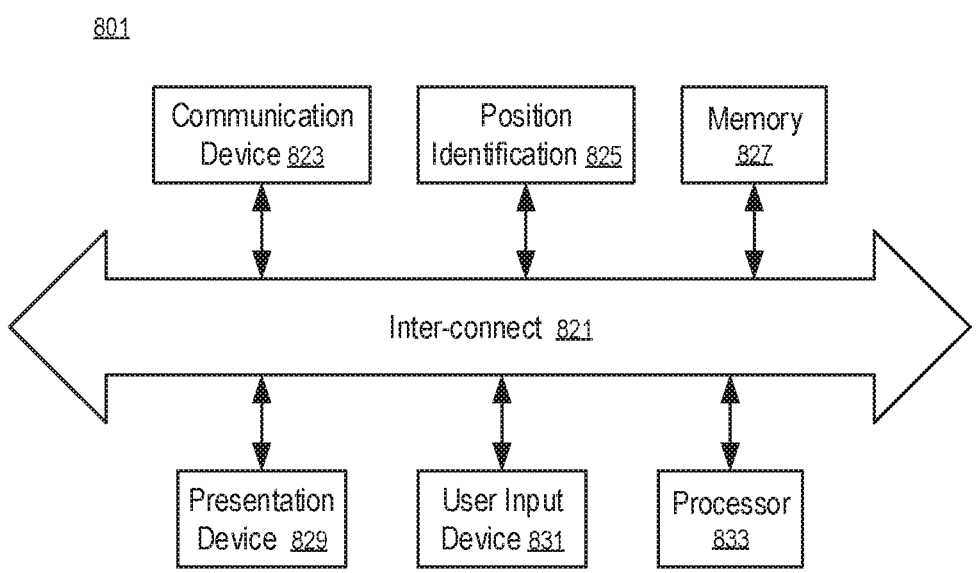
FIG. 8 shows a block diagram of a computing device (e.g., a mobile device of a user or a user terminal), according to some embodiments.

FIG. 8 shows a block diagram of a computing device (e.g., a mobile device of a user or a user terminal—such as the user terminals and mobile devices depicted in FIG. 1), according to some embodiments. In FIG. 8, the computing device 801 includes an inter-connect 821 connecting the presentation device 829 (such as a display screen), user input device 831, a processor 833, a memory 827, a position identification unit 825 and a communication device 823.

In FIG. 8, the position identification unit 825 is used to identify a geographic location. The position identification unit 825 can include a satellite positioning system receiver, such as a Global Positioning System (GPS) receiver, to automatically identify the current position of the computing device.

In FIG. 8, the communication device 823 can be configured to communicate with a server to provide data, including application data (e.g., an application identifier and a source identifier for a newly-sourced application). In some embodiments, the user input device 831 is configured to receive or generate user data or content. The user input device 831 can include a text input device, a still image camera, a video camera, and/or a sound recorder, etc.

In this description, various functions and operations can be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computing device or other system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    storing, in a computing device, historical domain name system (DNS) information from a plurality of sources of DNS information,
        wherein the historical DNS information comprises a plurality of historical DNS requests and a plurality of triggering events correlated to the plurality of historical DNS requests,
        wherein a triggering event of the plurality of triggering events is correlated to at least one historical DNS request of the plurality of historical DNS requests, and
        wherein the correlation between the triggering event and the at least one historical DNS request is configurable with a threshold confidence level associated with the correlation, the threshold confidence level stored in association with the correlation in the DNS information;
    identifying, by one or more sensors, an occurrence of a triggering event of the plurality of triggering events by detecting user action on the computing device,
        wherein the one or more sensors are in the computing device, attached to the computing device, connected to the computing device by a network link, or any combination thereof, and the user action is detected using data from the sensors;
    in response to identifying the occurrence of the triggering event, resolving, within a certain configurable time period after the triggering event, one or more answers to one or more DNS requests correlated with the triggering event based on the stored historical DNS information;
    storing, in the computing device, the one or more answers, such that the one or more answers are useable by requesters making the one or more DNS requests; and
    requesting, by a particular application running on the computing device, the one or more answers.

2. The method of claim 1, wherein:
    the particular application is a web browser, and the one or more answers are answers to the one or more DNS requests that comprise DNS requests for an initial rendering of a website.

3. The method of claim 1, wherein:
the particular application is a downloadable mobile application, and
the one or more answers are answers to the one or more DNS requests that comprise DNS requests for an initial rendering of the downloadable mobile application.

4. The method of claim 1, further comprising:
retrieving, by a transparent proxy connected to or running on the computing device, DNS information used in an initial rendering of a website; and
storing with the stored historical DNS information, the retrieved DNS information used in the initial rendering of the website.

5. The method of claim 1, further comprising:
retrieving, by a transparent proxy connected to or running on the computing device, DNS information used in a startup process of a downloaded mobile application; and
storing with the stored historical DNS information, the retrieved DNS information used in the startup process of the downloaded mobile application.

6. The method of claim 1, wherein:
the historical DNS information further comprises a plurality of DNS answers,
a group of the plurality of triggering events are further correlated to the plurality of historical DNS answers,
a triggering event of the group is correlated to at least one historical DNS answer of the plurality of historical DNS answers, and
the resolving of the one or more answers to the one or more DNS requests is based on one or more historical DNS answers of the plurality of historical DNS answers corresponding to the one or more DNS requests when the one or more historical DNS answers have an unexpired time to live (TTL).

7. The method of claim 1, further comprising:
storing, with the historical DNS information, assessments for each of the plurality of historical DNS requests;
in response to identifying the occurrence of the triggering event, determining a legitimacy level of the one or more answers to the one or more DNS requests correlated with the triggering event based on the assessments, wherein the legitimacy level comprises a probability that the one or more answers include a phishing attack; and
acting on the one or more answers according to the determined legitimacy level of the one or more answers.

8. The method of claim 7, wherein acting on the one or more answers comprises the storing of the one or more answers when the determined legitimacy level of the one or more answers exceeds a predetermined threshold.

9. The method of claim 8, wherein acting on the one or more answers comprises modifying the one or more answers and storing the one or more modified answers, such that the one or more modified answers are useable by requesters making the one or more DNS requests, when the determined legitimacy level of the one or more answers does not exceed the predetermined threshold.

10. The method of claim 8, wherein acting on the one or more answers comprises blocking the one or more answers, such that the one or more answers are not accessible by requesters making the one or more DNS requests, when the determined legitimacy level of the one or more answers does not exceed the predetermined threshold.

11. The method of claim 7, further comprising:
storing, with the historical DNS information, assessments for each of the plurality of triggering events correlated to the plurality of historical DNS requests;
in response to identifying the occurrence of the triggering event, determining a legitimacy level of the triggering event based on the assessments, wherein the legitimacy level of the triggering event comprises a probability that the triggering event includes a phishing attack; and
acting on the one or more answers according to the determined legitimacy level of the triggering event.

12. The method of claim 11, wherein acting on the one or more answers comprises the storing of the one or more answers, when the respective determined legitimacy levels of the one or more answers and the triggering event each exceed a predetermined threshold.

13. A system, comprising:
a first computing device, comprising a processor and a non-transitory computer-readable storage medium for tangibly storing thereon program logic for execution by the processor of the first computing device, the program logic of the first computing device comprising:
executable logic for storing historical domain name system (DNS) information from a plurality of sources of DNS information,
wherein the historical DNS information comprises a plurality of historical DNS requests and a plurality of triggering events correlated to the plurality of historical DNS requests,
wherein a triggering event of the plurality of triggering events is correlated to at least one historical DNS request of the plurality of historical DNS requests, and
wherein the correlation between the triggering event and the at least one historical DNS request is configurable with a threshold confidence level associated with the correlation, the threshold confidence level stored in association with the correlation in the DNS information; and
a second computing device communicatively coupled to the first computing device, comprising a processor and a non-transitory computer-readable storage medium for tangibly storing thereon program logic for execution by the processor of the second computing device, the program logic of the second computing device comprising:
executable logic for identifying, via one or more sensors, an occurrence of a triggering event of the plurality of triggering events by detecting user action on the second computing device,
wherein the one or more sensors are in the second computing device, attached to the second computing device, connected to the second computing device by a network link, or any combination thereof, and the user action is detected using data from the sensors;
executable logic for, in response to identifying the occurrence of the triggering event, resolving, within a certain configurable time period after the triggering event, one or more answers to one or more DNS requests correlated with the triggering event based on the stored historical DNS information;

executable logic for storing the one or more answers, such that the one or more answers are useable by requesters making the one or more DNS requests; and executable logic for hosting a particular application, running on the second computing device, that requests the one or more answers.

14. The system of claim 13, wherein:

the particular application is a web browser, and the one or more answers are answers to the one or more DNS requests that comprise DNS requests for an initial rendering of a website.

15. The system of claim 13, wherein:

the particular application is a downloadable mobile application, and the one or more answers are answers to the one or more DNS requests that comprise DNS requests for an initial rendering of the downloadable mobile application.

16. The system of claim 13, wherein the program logic of the first computing device comprises:

executable logic for retrieving, by a transparent proxy connected to or running on the first computing device, DNS information used in an initial rendering of a website; and executable logic for storing with the stored historical DNS information, the retrieved DNS information used in the initial rendering of the website.

17. The system of claim 13, wherein the program logic of the first computing device comprises:

executable logic for retrieving, by a transparent proxy connected to or running on the first computing device, DNS information used in a startup process of a downloaded mobile application; and executable logic for storing with the stored historical DNS information, the retrieved DNS information used in the startup process of the downloaded mobile application.

18. The system of claim 13, wherein:

the historical DNS information further comprises a plurality of DNS answers, a group of the plurality of triggering events are further correlated to the plurality of historical DNS answers, a triggering event of the group is correlated to at least one historical DNS answer of the plurality of historical DNS answers, and the resolving of the one or more answers to the one or more DNS requests is based on one or more historical DNS answers of the plurality of historical DNS answers corresponding to the one or more DNS requests when the one or more historical DNS answers have an unexpired time to live (TTL).

19. The system of claim 13, wherein:

the program logic of the first computing device comprises executable logic for storing, with the historical DNS information, assessments for each of the plurality of historical DNS requests; and the program logic of the second computing device comprises:

executable logic for, in response to identifying the occurrence of the triggering event, determining a legitimacy level of the one or more answers to the one or more DNS requests correlated with the triggering event based on the assessments, wherein the legitimacy level comprises a probability that the one or more answers include a phishing attack; and executable logic for acting on the one or more answers according to the determined legitimacy level of the one or more answers.

20. A non-transitory computer-readable storage medium tangibly encoded with computer-executable instructions, that when executed by a processor associated with a computing device, performs a method, the method comprising:

storing historical domain name system (DNS) information from a plurality of sources of DNS information, wherein the historical DNS information comprises a plurality of historical DNS requests and a plurality of triggering events correlated to the plurality of historical DNS requests, wherein a triggering event of the plurality of triggering events is correlated to at least one historical DNS request of the plurality of historical DNS requests, and wherein the correlation between the triggering event and the at least one historical DNS request is configurable with a threshold confidence level associated with the correlation, the threshold confidence level stored in association with the correlation in the DNS information;

identifying, via one or more sensors, an occurrence of a triggering event of the plurality of triggering events by detecting user action on the computing device, wherein the user action is detected using data from the sensors;

in response to identifying the occurrence of the triggering event, resolving, within a certain configurable time period after the triggering event, one or more answers to one or more DNS requests correlated with the triggering event based on the stored historical DNS information; and storing the one or more answers, such that the one or more answers are useable by requesters making the one or more DNS requests.

21. The method of claim 1, wherein the one or more sensors include at least one of an accelerometer or a gyroscope.

* * * * *